United States Patent [19]
Cuykendall et al.

[11] Patent Number: 4,965,760
[45] Date of Patent: Oct. 23, 1990

[54] SATURATED OPTICAL INTERACTION GATE

[75] Inventors: Robert R. Cuykendall; Karlheinz Strobl, both of Iowa City, Iowa

[73] Assignee: University of Iowa Research Foundation, Iowa City, Iowa

[21] Appl. No.: 341,696

[22] Filed: Apr. 21, 1989

[51] Int. Cl.$^5$ ............................................. G06F 7/56
[52] U.S. Cl. ................................................. 364/713
[58] Field of Search ................ 364/713, 807, 822, 837

[56] References Cited

U.S. PATENT DOCUMENTS 4,811,258  3/1989  Andersen et al. .................... 364/713

OTHER PUBLICATIONS

Kaplan, "Theory of hysteresis reflection and refraction of light by a boundary of a nonlinear medium", Sov. Phys. JETP 45(5), May 1977, 896–905.
Smith et al, "Experimental Studies of a Nonlinear Interface", IEEE QE-17, 1981, pp. 340–348.
Tomlinson et al, "Reflection of Gaussian beam at a nonlinear interface", Appl. Oct. 21, 1982, pp. 2041–2051.
Cuykendall et al, "Reversible Computing: All-Optical implementation of interaction and priese gates", Opt. Comm. 62, No. 4, pp. 232–236, May 1987.
Smith et al, "Nonlinear Optical Interfaces: Switching Behavior", IEEE QE-20, pp. 30–36, 1984.
Cuykendall, "Three-port reversible logic", Applied Optics, vol. 27, No. 7, pp. 1772–1779, May 1988.
Cuykendall et al, "Reversible optical computing circuits" Optics Letters, vol. 12, No. 7, Jul. 1987, pp. 542–544.
Cuykendall et al, "Thin-film computing with the non-linear interface", J. Opt. Soc. Am. B, vol. 6, No. 5, May 1989, pp. 877–883.
Andersen et al, "Slam-Vectorized Calculation of Refraction and Reflection for a Gaussian Beam at a Nonlinear Interface . . . " Comp. Phys. Comm. 48, pp. 255–264, 1988.
Tamir, "Nonspecular phenomena in beam fields reflected by multilayered media," J. Opt. Soc. Am. A/-vol. 3, No. 4, pp. 558–565, 4/1986.
Smith et al, "Use of a liquid suspension of dielectric spheres as an artificial Kerr medium," vol. 7, No. 8, 8/1982, pp. 347–349, Optics Letters.
Strobl et al "Reflection at a nonlinear interface" to be published in Advances in Laser Science IV (Am. Inst. of Physics, N.Y. 1989).
Strobl et al, "Observation of Single Step Switching et al. Nonlinear Interface" Submitted to Phys. Rev. A. Mar. 20, 1989.
Strobl et al, "Evidence of Saturation Enhanced Switching at a Nonlinear Interface" Submitted to Opt. Lett., Mar. 20, 1989.
Goos et al, "Ein neuer und fundamentaler Versuch zur Totalreflexion", Ann. Physik 1(6), 1947, pp. 333–345.

Primary Examiner—Gary V. Harkcom
Assistant Examiner—Tan V. Mai
Attorney, Agent, or Firm—Henderson & Sturm

[57] ABSTRACT

Experimental studies of a nonlinear interface have indicated that saturation of the nonlinear refractive index may play a critical role in controlling the transition from total internal reflection to nearly total transmission. Numerical simulations of the behavior of a saturated nonlinear interface confirm that saturation effects can dramatically improve transmitted beam shape and switching quality.

38 Claims, 11 Drawing Sheets

FABRY-PEROT
MATERIAL SELECTION TABLE

| MATERIAL | TRANSMISSION AT |
|---|---|
| Positive Nonlinear | High Intensity |
| Negative Nonlinear | High Intensity |
| Positive Nonlinear | Low Intensity |
| Negative Nonlinear | Low Intensity | ns
SATURATED OPTICAL INTERACTION GATE

TECHNICAL FIELD

This invention relates to component useful in optical computing circuits, and more particularly to a saturated optical interaction gate useful in all-optical computing circuits.

BACKGROUND ART

U.S. Pat. No. 4,811,258 discloses a reversible all optical implementation of an interaction gate. One embodiment of the interaction gate disclosed was a dual beam version of an optical nonlinear interface. Another embodiment was a dual beam Fabry-Perot.

A nonlinear interface is commonly known as a plane interface between two dielectric media, one of which has an intensity dependent nonlinear refractive index. There has been much interest in the nonlinear interface (NI) and its behavior over the past decade (see A. E. Kaplan, "Theory of Hysteresis Reflection and Refraction of Light by a Boundary of a Nonlinear Medium", Sov. Phys. JETP 45, 896 (1977); P. W. Smith, W. J. Tomlinson, P. J. Maloney and J.-P. Hermann, "Experimental Studies of a Nonlinear Interface", IEEE QE-17, 340 (1981); W. J. Tomlinson, J. P. Gordon, P. W. Smith and A. E. Kaplan, "Reflection of a Gaussian Beam at a Nonlinear Interface", Appl. Opt. 21, 2041 (1982); P. W. Smith and W. J. Tomlinson, "Nonlinear Optical Interfaces: Switching Behavior", IEEE QE-20, 30 (1984); R. Cuykendall and D. Andersen, "Reversible Computing: All-Optical Implementation of Interaction and Priese Gates", Opt. Comm. 62, 232 (1987); "Reversible Optical Computing Circuits", Opt. Lett. 12, 542 (1987); R. Cuykendall, "Three-Port Reversible Logic", Appl. Opt. 27, 1772 (1988); D. R. Andersen, R. Cuykendall and J. Regan, "Slam-Vectorized Calculation of Refraction and Reflection for a Gaussian Beam at a Nonlinear Interface in the Presence of a Diffusive Kerr-like Nonlinearity", Comp. Phys. Commun. 48, 255 (1988); and R. Cuykendall and K. Strobl, "Thin Film Computing with the Nonlinear Interface", JOSA-B, to be published, (1989). This was due primarily to its potential for ultrafast (subpicosecond) switching. Early experiments and simulations both indicated intrinsic limitations to beam and switching quality, i.e. transmitted beam breakup associated with multiple intensity thresholds and low contrast between total internal reflection and transmission.

Those concerned with these and other problems recognize the need for an interaction gate with improved switching quality.

DISCLOSURE OF THE INVENTION

The present invention provides a saturated optical interaction gate based on the interaction gate disclosed in U.S. Pat. No. 4,811,258, which Patent is hereby incorporated herein by reference. The saturated optical interaction gate includes a nonlinear interface formed of materials chosen to enhance reflection of beams at a first total intensity and to enhance transmission of the beams at a second total intensity.

An object of the present invention is the provision of an improved saturated optical interaction gate.

Another object is to provide a saturated optical interaction gate having enhanced switching qualities.

A further object of the invention is the provision of a saturated optical gate that is utilized in designing all-optical circuits.

An additional object is to provide an optical interaction gate that can be designed alternatively to transmit either at high or at low intensity.

These and other attributes of the invention will be become clear upon a thorough study of the following description of the best mode for carrying out the invention, particularly when reviewed in conjunction with the drawings.

BEST MODE FOR CARRYING OUT THE INVENTION

Figure 2:
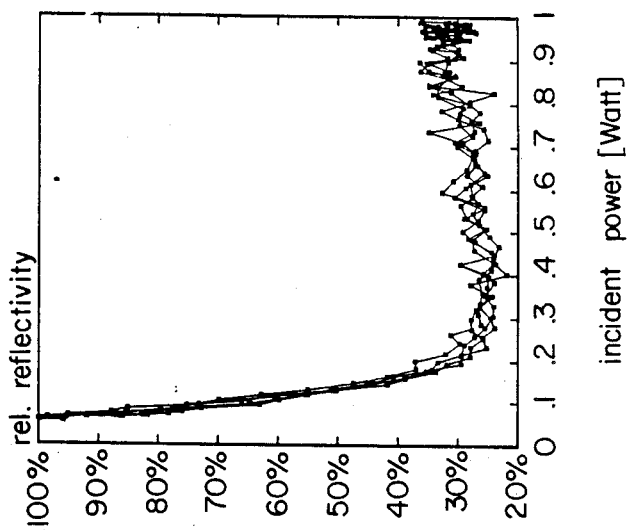
FIG. 2 is a graph showing the saturation enhanced NI switching for an incident glancing angle $\Psi=7.3°$ and an artificial Kerr medium having a volume concentration of 10.5%.

An experiment (see K. H. Strobl and R. Cuykendall, submitted to Phys. Rev. A (1989)) investigating reflectivity of a light beam crossing a plane interface between two dielectric materials with a low intensity refractive index offset $\Delta$, one having an intensity dependent index, showed unexpected plane wave-like behavior (see A. E. Kaplan, JETP Lett. 24, 114 (1976); Sov. Phys. JETP 45, 896 (1977)) [high contrast single-threshold switching]. The reasons for such behavior were not evident from the particular findings reported. However, saturation of the nonlinear index was suspected (see K. H. Strobl and R. Cuykendall, submitted to Phys. Rev. A (1989)) as a possible mechanism washing out the undesirable multiple thresholds predicted by the standard two-dimensional simulation (see W. J. Tomlinson, J. P. Gordon, P. W. Smith and A. E. Kaplan, Appl. Opt. 21, 2041 (1982); P. W. Smith and W. J. Tomlinson, IEEE QE-20, 30 (1984)) of a Gaussian beam incident at such a nonlinear interface (NI). Moreover, the observation of multiple intensity thresholds (see P. W. Smith and W. J. Tomlinson, IEEE QE-20, 30 (1984)) led to the conclusion they were characteristic of NI behavior. Recent theoretical studies (see R. Cuykendall, Appl. Opt. 27, 1772 (1988); R. Cuykendall and K. H. Strobl, in press, JOSA-B (May, 1989)) have shown that improved switching behavior [reduction in beam breakup due to multiple thresholds] can be achieved by including diffusion in the two-dimensional model. The simulation of a saturated nonlinear interface (SNI) confirms that saturation effects can also cause the observed plane wave-like behavior. Experimental results of enhanced NI switching provide evidence that saturation of the non-linear refractive index is the primary influence.

The standard two-dimensional Gaussian model prediction (see K. H. Strobl and R. Cuykendall, submitted to Phys. Rev. A (1989); W. J. Tomlinson, J. P. Gordon, P. W. Smith and A. E. Kaplan, Appl. Opt. 21, 2041 (1982); P. W. Smith and W. J. Tomlinson, IEEE QE-20, 30 (1984)) for an NI is based on the assumption that the induced index change $\Delta n$ is directly proportional to the local light intensity I, i.e.

$$\Delta n = n_2 I. \quad (1)$$

The Kerr coefficient $n_2$ is a measure of the strength of the nonlinear response. Under this condition the model predicts that each interference fringe [formed by the incident and reflected wave at the interface] suddenly switches through the interface when its peak intensity reaches a threshold value, resulting in a sharp drop in total reflectivity and formation of an additional self-focused channel propagating in the nonlinear medium. Between adjacent intensity thresholds the reflectivity increases with intensity due to increased index mismatch for the already transmitted fringes. By saturating equation (1) in such a way that transmitted fringes can only cause limited overshooting of the ideal index change $\Delta$, reflectivity increase between thresholds should be preventable. Since the reflectivity can then only decrease, deeper total switching would result with a pronounced initial drop. Depending on the amount of saturation, subsequent reflectivity 'oscillations' will be lessened or possibly nonexistent. For this reason better switching quality is expected for a saturated NI than for a standard NI. This SNI picture can be tested experimentally if a way can be found to influence the amount of saturation in the nonlinear medium.

Figure 1:
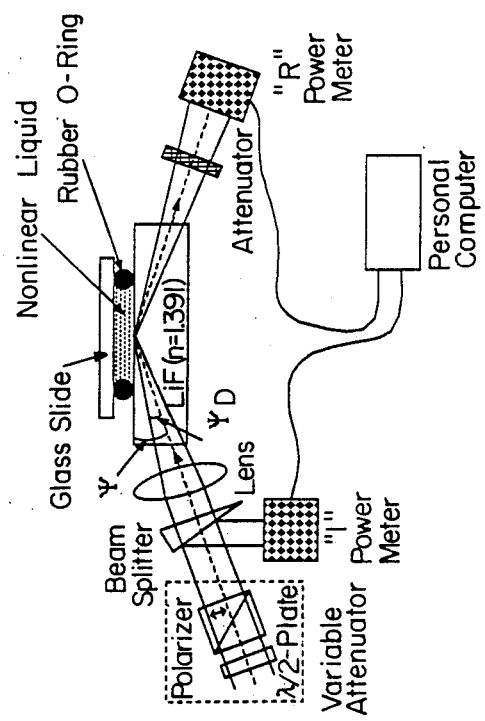
FIG. 1 is a schematic showing the experimental set up.

The experimental set up used is shown in FIG. 1. Briefly, a p-polarized output of a CW argon ion laser ($\lambda=514.5$ nm) was focused at the horizontal interface to a spot size with a theoretical 1/e amplitude radius $w_o$ and a far-field diffraction angle $\Psi_D$ in the linear medium. A polarizer combined with a rotatable $\lambda/2$-plate allowed continuous attenuation of the incident light beam while identical power meters (I and R) measured the incident and reflected power each second. The refractive index for the linear medium (LiF) is $n_o=1.391$. The nonlinear medium consisted of an aqueous suspension of highly uniform polystyrene spheres with a radius $r \approx \lambda/4$. In addition, the nonlinear liquid contained small amounts of surfactant and was saturated with LiF in order to prevent surface etching of the LiF crystal.

A simple explanation of the behavior of dielectric spheres in suspensions exposed to an electromagnetic field gradient can be given (see P. W. Smith and W. J. Tomlinson, IEEE QE-20, 30 (1984); P. W. Smith, P. J. Maloney and A. Ashkin, Opt. Lett. 7, 347 (1982)). The light-induced force on the spheres is proportional to the gradient of a field, and therefore can be expressed in terms of a potential $\phi$. This force attracts the sphere in the high intensity region, increasing the particle density locally, resulting in a refractive index change, and is opposed by thermal diffusion (Brownian motion) of the particles. The quasi-stationary equilibrium sphere-density distribution caused by the potential $\phi$ can be found from a standard diffusion model in which the sphere-density is proportional to $\exp(-\phi/kT)$. Assuming the validity of this explanation it was found that for a not-too-intense light beam ($\phi_{max} \leq kT$) the induced density distribution is only negligibly sharper than the intensity profile. Under such conditions the thermal diffusion counterbalances the optical pressure, resulting in a density distribution which follows the intensity variation. The effect of Brownian diffusion in this particular system is thus to simulate a diffusionless Kerr-like nonlinearity, i.e. equation (1). Based on this description, it can be shown (see P. W. Smith, P. J. Maloney and A. Ashkin, Opt. Lett. 7, 347 (1982)) that for spheres with a radius r much smaller than the wavelength (Rayleigh regime), $$n_2 \approx \frac{8\pi^2 n_l^2}{3kTc} \frac{(n_{s,l}^2 - 1)(n_{s,l} - 1)}{n_{s,l}^2 + 2} r^6 N \quad (2)$$

where $n_l$ is the refractive index of the surrounding liquid, $n_{s,l}$ is the ratio between the refractive indices for the spheres and the liquid, and N is the number of spheres per unit volume. The sphere size was selected to give the highest possible nonlinearity while still approximately satisfying the Rayleigh condition. This allowed the best chance to observe saturation effects for the available CW laser power ($\approx 1.3$ W). Since the trade off for such a high nonlinearity was a nonlinear medium with a very slow response time ($\approx 100$ ms), only quasi-stationary NI behavior was investigated by using CW operation together with a slow intensity attenuation (111 seconds from high to low).

Equation (1) neglects, among other effects, the actual sphere size, the agglomeration and the coulomb repulsion/attraction due to surface charges/induced dipole moment and dissolved ions. However, it is clear that the spheres cannot be packed denser than hexagonal or cubic close packing permits. This gives an upper limit of $\Delta n_{max.} = 0.14$ for the induced index change in the polystyrene water suspension. Long before that limit is reached, coulomb forces and particle interactions resulting in increased viscosity will slow down the response by saturating the nonlinear index, resulting in an effective refractive index change which is smaller than the one predicted by equation (1).

An earlier NI experiment (see P. W. Smith and W. J. Tomlinson, IEEE QE-20, 30 (1984)) using a quartz suspension reported a switching contrast ratio of 1.4 through a double threshold. With a polystyrene suspension a 3 to 1 contrast was found and only a single threshold was observed. However, agglomeration problems may have dominated the switching behavior with the quartz suspension. This effect was significantly reduced in the polystyrene experiment (or was at least mostly reversible) due to the presence of surfactant and the surface charge of the polystyrene spheres. If saturation was actually preventing the appearance of multiple thresholds, thereby enhancing the switching quality then by modifying the material response characteristic one should be able to manipulate the switching behavior. For example, a higher density suspension should cause increased switching contrast since saturation effects are more likely to occur, resulting in reduced overshooting.

In order to test this idea an artificial Kerr medium was used having a volume concentration of 10.5% and a similar sphere radius $r = 0.137$ nm. This product (obtained from Seragen Diagnostics) already contained a surfactant concentration of 0.1–0.5% to prevent coagulation. The low intensity refractive index of the nonlinear medium was thus offset by a calculated value $\Delta \approx 0.031$ from $n_o$ and the resulting critical glancing angle for TIR was therefore $\Psi_{crit} = 12.1°$. Assuming the validity of equation (2) an effective nonlinear Kerr coefficient of $n_2 = 0.57$ cm$^2$/MW is predicted. The switching result obtained for this particular nonlinear medium at a glancing angle $\Psi = 7.3°$ and theoretical focusing condition $w_o = 4.4$ nm appears in FIG. 2. It shows the intensity dependent reflectivity curve normalized (The denser suspension had a total reflectivity loss along the interface on the order of 50%, while the less denser suspension had a reduced loss of roughly 10%) versus the low intensity value, and is the best switching curve obtained for various glancing angles. To convert from incident power $P = w_o^2 I_{max}/2$ normalized intensity $n_2 I_{max}/\Delta$ using calculated values for $n_2$, $w_o$ and $\Delta$, one must multiply the x-axis by a factor $\approx 61$.

The switching contrast depended somewhat on the filling procedure for the nonlinear medium so that FIG. has to be considered as the best observed case and not as an absolute measurement. This dependence on the NI preparation is another indication that the specific nonlinear response function $\Delta n(I)$ (modified by the slightly different preparations) strongly affects the switching behavior: the normalized reflectivity curves were typically reproducible within 5–10% over a period of ½ hour if only the incident intensity was varied; they differed on the order of 10–20% if the laser intersected the interface at a different location of the NI (uncertainty in reproducing identical focus conditions); and differed by up to a factor 2 if various fillings, LiF crystal repolishings, etc. were compared. Nevertheless, it was found that under certain conditions the denser suspension produced better switching than lower concentration levels.

Provided with this indication that saturation may well be a primary factor, a different approach to modifying the index response function was tried: 'softening' the saturation of the induced index change. To accomplish this, the orientation of the NI was rotated from the usual horizontal to a vertical orientation. A redesigned NI supporting apparatus allowed reduction in the thickness of the nonlinear medium from 2 mm to roughly 200 $\mu$m and permitted a more reproducible filling procedure. These geometry changes were intended to minimize particle deposition as well as laser-induced particle agglomerations. The latter would tend to move out of the laser focus simply by means of gravity, slowing the index change. Convection due to gravity (and laser-induced heating) was maximized by this vertical geometry further reducing the induced index change through delocalization. Under such conditions, one would expect a higher threshold intensity and lower switching contrast for a given maximum intensity.

Figure 3:
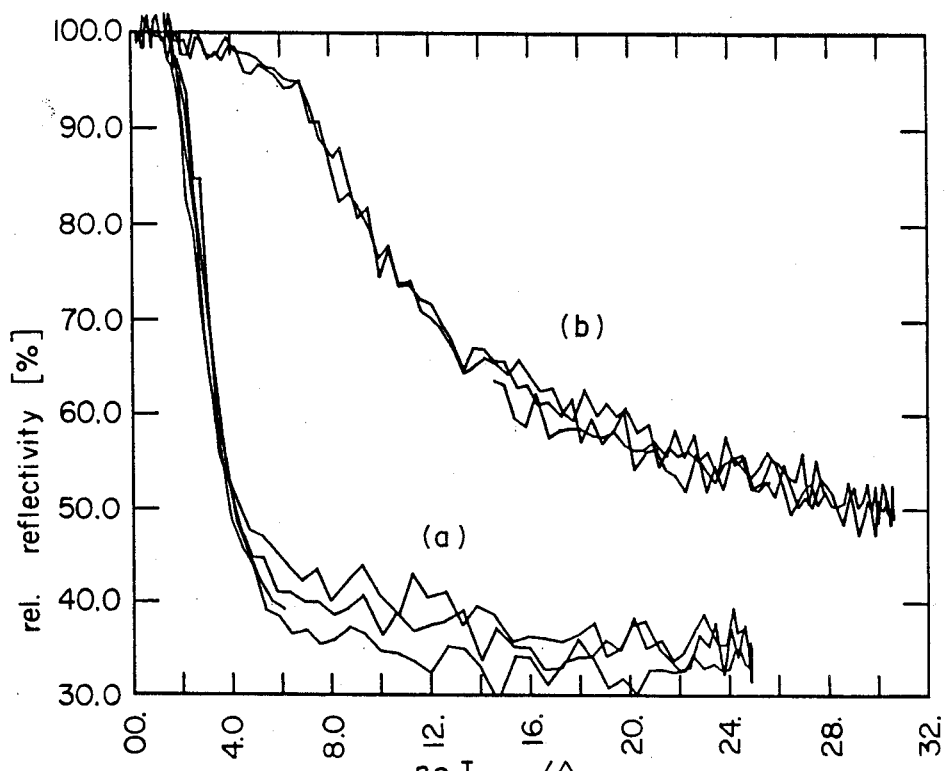
FIG. 3 is a graph showing the intensity dependence of NI reflectivity for a volume concentration of 7.7% at $\Psi=7.3°$: (a) best results obtained for horizontally oriented NI; and (b) typical measurement for a vertical NI with softer saturation.

The effect of rotating the NI from a horizontal to vertical orientation can be seen in FIG. 3 which was obtained for $\Psi = 7.3$. with a nonlinear liquid (Surfactant-free product of Interfacial Dynamics Corp.) [7.7 vol. % polystyrene spheres ($r = 138.5$ $\mu$m) suspended in water with roughly 0.5% nonionic surfactant and calculated $\Delta = 0.038$, $n_2 = 0.44$ cm$^2$/MW, $\Psi_{crit} = 13.4°$, $w_o \approx 5$ $\mu$m and $\Psi_D = 1.3°$]. FIG. 3($a$) shows the best switching results found with the horizontal NI for various glancing angles, while FIG. 3($b$) represents a typical intensity dependence obtained with the vertically oriented NI for the same $\Psi$.

These changes sharply improved the reproducibility of the results. Absolute reflectivity changed roughly 10% in the vertical orientation over a 2 hour period while in some special cases (not FIG. 2) the horizontal configuration showed an absolute exponential reflectivity decay with a time constant as low as 30 minutes. Moreover, repolishing the LiF crystal, filling of the nonlinear liquid and reoptimizing the focus typically caused variations on the order of 10% for the vertical NI, while 10 times larger variations were observed in the horizontal case. As expected, threshold intensity increased and switching contrast decreased.

In summary, NI switching with enhanced contrast and a single intensity threshold has been demonstrated. This behavior can be explained by including saturation effects in the standard NI model. The evidence that saturation is the primary factor responsible for the high switching quality is not conclusive, but it seems the most likely explanation. Further investigations, both theoretical and experimental, are necessary for confirmation and to firmly establish the ideal shape of the nonlinear refractive index response function. Since saturation effects in general occur on a very short time scale, such findings will likely have a significant impact on the application of NI's in ultrafast optical signal processing.

The nonlinear refractive index response function, or saturation function, can be generally designated a $\Delta n(I)$. The function equals zero at zero intensity. For positive intensity, nonlinear positive materials have only positive values, and nonlinear negative materials have only negative values. Further, slower nonlinear materials exhibit a reduced index change for a given intensity. All saturation functions $\Delta n(I)$ have a limiting value called $\Delta_{sat}$ for the specific saturation function.

The first indication that improvement was possible came from introducing a diffusion mechanism into the standard NI model (see R. Cuykendall and D. Andersen, Opt. Comm. 62, 232 (1987) and Opt. Lett. 12, 542 (1987); R. Cuykendall, Appl. Opt. 27, 1772 (1988); D. R. Andersen, R. Cuykendall and J. Regan, Comp. Phys. Commun. 48, 255 (1988); R. Cuykendall and K. Strobl, JOSAB, to be published, (1989)) delocalizing the induced index change. Experimental findings (see K. H. Strobl, R. Cuykendall, B. Bockhop and D. Megli, to be published in *Advances in Laser Science IV*, J. Gole, D. Heller and W. C. Stwalley, editors, (American Institute of Physics, New York, 1989); K. H. Strobl and R. Cuykendall, submitted to Phys. Rev. A; K. H. Strobl and R. Cuykendall, submitted to Opt. Lett.) strongly suggest that saturation may also be a mechanism for achieving enhanced switching quality. The standard NI model is herein extended to include hard-limited saturation of the induced nonlinear refractive index change. Saturation is shown to have a significant impact on improving the intrinsic NI switching behavior. Since most saturation effects are virtually instantaneous, such findings may stimulate use of the NI in novel applications.

STANDARD NI MODEL

Figure 4:
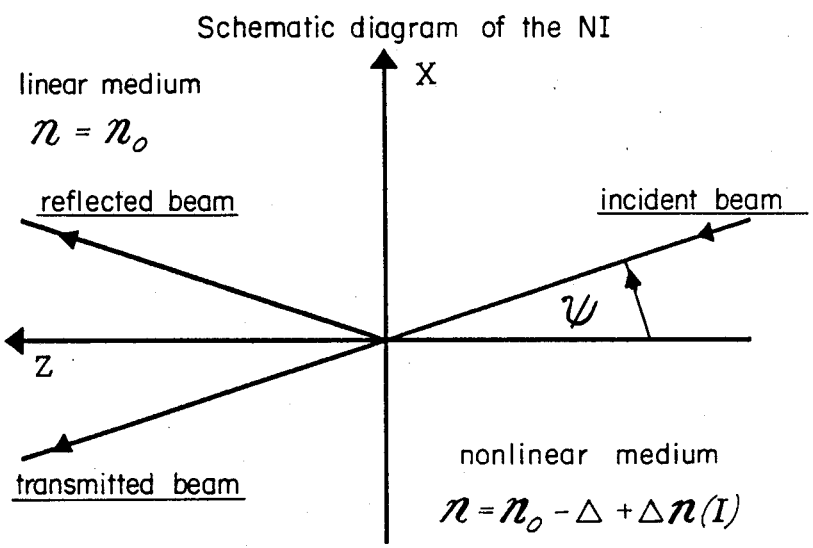
FIG. 4 is a schematic diagram of the nonlinear interface configuration and coordinate systems used for the computations. Computation starts in the negative Z halfspace and progresses versus the positive Z halfspace. The linear medium fills the positive X half-space and nonlinear the negative X half-space.
Figure 5:
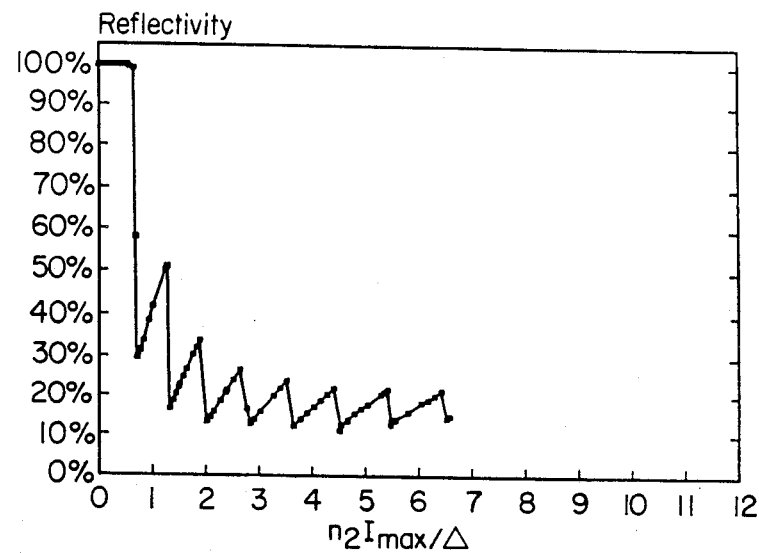
FIG. 5 is a typical 'saw-tooth' reflectivity curve predicted by the standard model simulating the reflection and transmission of a two-dimensional Gaussian beam incident on the NI having a Kerr-like nonlinearity for the refractive index. Interface and beam parameters are $\Delta=0.01$, $n_o=1.391$, $\Psi=7.3°$ and $w_o=10\lambda=10$ $\mu$m.

A schematic diagram of a nonlinear interface is given in FIG. 4. The standard (no diffusion and saturation effects) two-dimensional Gaussian model prediction (see W. J. Tomlinson, J. P. Gordon, P. W. Smith and A. E. Kaplan, Appl. Opt. 21, 2041 (1982); P. W. Smith and W. J. Tomlinson, IEEE QE-20, 30 (1984); K. H. Strobl and R. Cuykendall, submitted to Phys. Rev. A.) for an NI is based on the assumption that the light induced index change $\Delta n(I)$ is directly proportional to the local light intensity I. The refractive index of the nonlinear medium is then given by the formula $$n = n_o - \Delta + \Delta n(I) = n_o - \Delta + n_2 I \qquad (3)$$

where $n_o$ is the refractive index of the linear medium, $\Delta$ is the low intensity refractive index offset between the two dielectric media comprising the NI and $n_2$ is a Kerr-constant having the same sign as $\Delta$. This model predicts the existence of multiple thresholds in the intensity dependence of the NI reflectivity for a two dimensional Gaussian beam incident on the NI from the linear medium. These thresholds are associated with the appearance of additional transmitted (self-focused) channels arising from additional fringes [formed by the incident and reflected wave at the interface] reaching the threshold intensity allowing them to switch through the interface. An example of the resulting characteristic saw tooth reflectivity curve is shown in FIG. 5 for the case $\Delta = 0.01$, $n_o = 1.391$ and an incident Gaussian beam having an intensity $I_{max}$ and a minimum 1/e amplitude radius of $w_o = 10\lambda = 10$ μm for the focus at the interface [neglecting reflections at the interface]. The incident glancing angle was $\Psi = 7.3° = 0.55 \, \Psi_{crit}$ with $\Psi_{crit}$ being the critical glancing angle for plane waves. Numerical data point (small squares) are connected with straight lines to guide the eye.

Between adjacent intensity thresholds the reflectivity increases with intensity. The reason for this reflectivity increase is due to an overshooting of the refractive index $n_o$ in the nonlinear medium. This cause increased index mismatch resulting in a reduced transmission value for the already transmitted fringes. After a couple of fringes have already switched through the interface, the newly added fringes compensate on the average the transmission loss of earlier transmitted fringes resulting in a stable 'average' reflectivity for intensities well above threshold. It is unknown if this compensation is generally balanced for any high intensity since the computer program used requires excessive runtime [resolution] for intensities higher than the one shown in FIG. 5. But it seems to be true between 13 and 20 times the first threshold. Note that in contrast to these predictions of approximate stable averaged reflectivity at high intensities for Gaussian beams, the plane wave model (see A. E. Kaplan, Sov. Phys. JETP 45, 896 (1977); K. H. Strobl and R. Cuykendall, submitted to Phys. Rev. A.) shows a steady increase of the NI reflectivity for intensity values above $n_2 I / \Delta = 1$.

Figure 6:
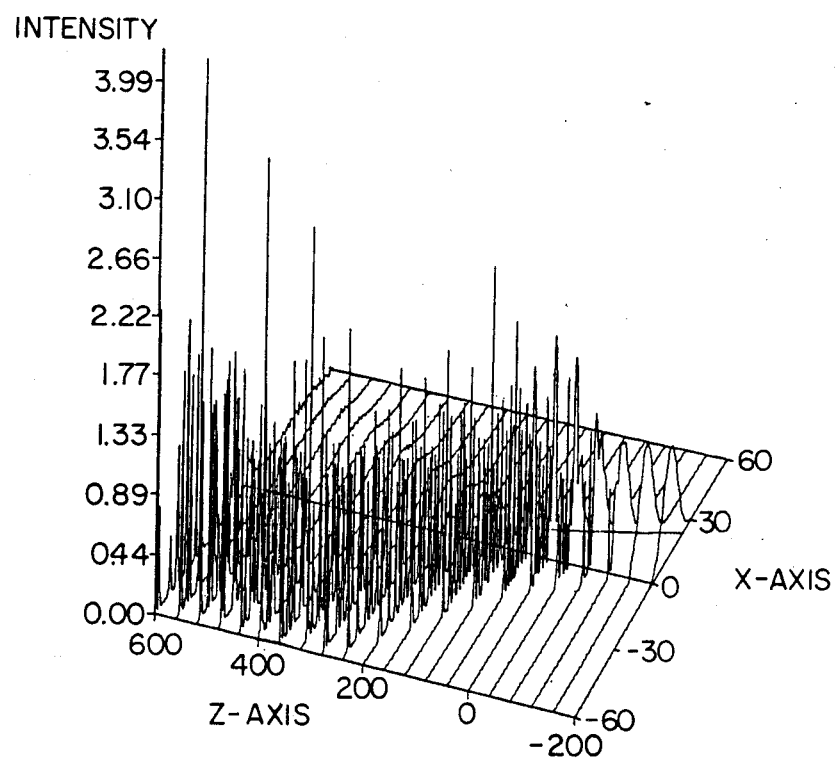
FIG. 6 is a graph illustrating the intensity distribution for the reflected and transmitted beam calculated with the standard NI model for the parameter used to generate FIG. 5 at an incident intensity $n_2I_{max}/\Delta=11.6$. Roughly 80% of the incident beam gets transmitted in the nonlinear medium and splits up into 13 self-focused channels.

The beam breakup connected with the multiple thresholds can be observed in FIG. 6 which shows the calculated high resolution intensity distribution of the parameters used to generate FIG. 5 for a normalized intensity $n_2 I_{max}/\Delta = 11.6$. The transmitted beam is broken up into 13 self-focused channels and is therefore only of limited use for optical applications.

SATURATED NONLINEAR INTERFACE (SNI) MODEL

By extending the standard NI model to include the effect of nonlinear refractive index saturation, the undesirable index overshooting should be prevented so that ideally the local 'self-transparensation' area at the interface increases continuously with increasing incident intensity. The (local) reflectivity increase would then be prevented. This can be obtained by saturating equation (3) in such a way that transmitted fringes can cause no or only limited overshooting of the desired index change $\Delta$. Since in the former case the reflectivity can then only decrease, deeper total switching should result with a pronounced initial drop. Depending on the amount of saturation (overshooting limit), subsequent reflectivity 'oscillations' will be lessened or possibly nonexistent.

The simplest way to introduce saturation effects in the standard NI model description is to assume the following 'hard limited' Kerr-like intensity dependency of the refractive index n for the nonlinear medium $$n = \begin{cases} n_o - \Delta + n_2 I & \text{if } n_2 I < \Delta_{sat} \\ n_o - \Delta + \Delta_{sat} & \text{if } n_2 I_{max} \geq \Delta_{sat} \end{cases} \quad (3)$$

where $\Delta_{sat}$ is the maximum refractive index shift which can be induced in the nonlinear medium by a local intensity I. This very simple saturation model allows investigation of the basic effects of saturation on the NI switching behavior. To do this, first an investigation of how sensitive the switching curve depends on the limiting parameter $\Delta_{sat}$ will be carried out and then a determination of the angle and beam waist dependence of the saturation curve will follow. Unless stated differently the parameter used throughout this paper are identical to the one used to generate FIG. 5.

Figure 7:
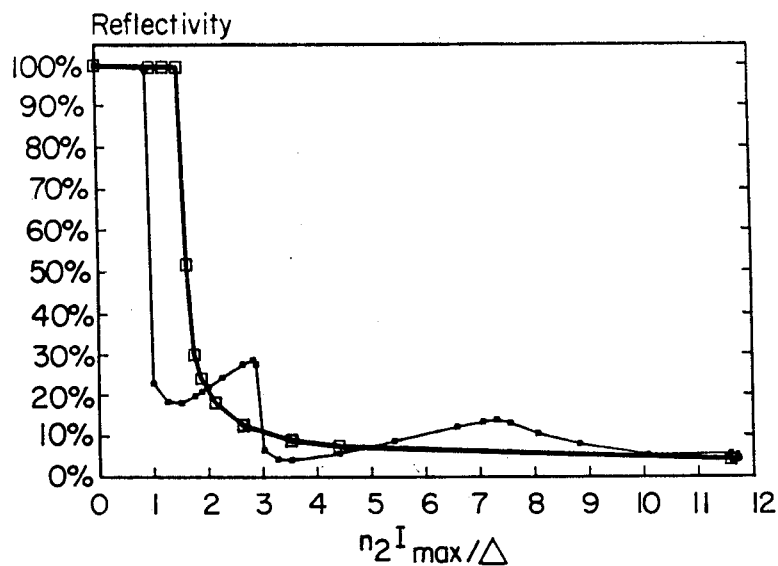
FIG. 7 is a graph depicting the hard limited SNI model prediction with (a) 'ideal' saturation $\Delta_{sat}=3\Delta$ (big squares connected by thick lines) and (b) slight overshooting $\Delta_{sat}=1.5\Delta$ (small squares with thin line). Note the large difference in switching behavior for small deviation from the ideal saturation case.
Figure 8:
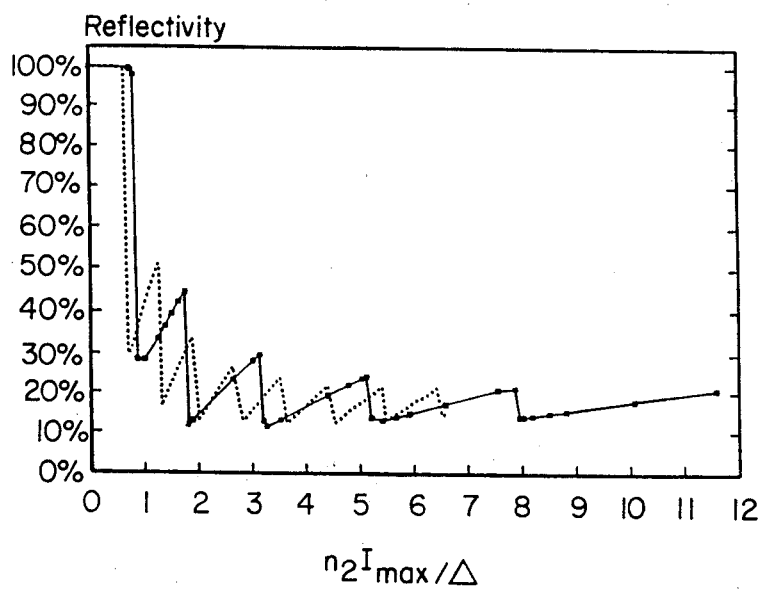
FIG. 8 is a graph showing the hard limited SNI model prediction as in FIG. 7 with (a) $\Delta_{sat}=3\Delta$ (squares connected by thin lines) and (b) $\Delta_{sat}=\infty$ (dotted line). Note the small difference in switching behavior when going from case (a) to case (b).

SNI dependence on the limiting value $\Delta_{sat}$. The variation of the NI behavior when going from $\Delta_{sat}=\Delta$ to $\Delta_{sat}=\infty$ is shown in FIGS. 7 and 8. In the "ideal" hard limited case [FIG. 7(a)] with $\Delta_{sat}=\Delta$ we obtain, as expected, a smooth and steady reflectivity dropping above threshold. Slightly overshooting this condition destroys immediately the monotony of the reflectivity curve and causes the reappearance of additional thresholds. This behavior can be observed when comparing FIG. 7(a) with FIG. 7(b) showing the case $\Delta_{sat}=1.5\Delta$. Note the difference between the first sharp additional threshold and the second much more diffuse one. Further doubling of $\Delta_{sat}$ to $3\Delta$ [FIG. 8(a)] increases the number of additional thresholds from two to five and results in a notable lift of the (average) reflectivity curve. Additional increase of $\Delta_{sat}$ produces only small changes to FIG. 8(a) so that in the case $\Delta_{sat}=>$, displayed in FIG. 8(b), the number of additional thresholds is only a factor of roughly 2.5 higher than in the $\Delta_{sat}=3\Delta$ case with nearly no additional lift of the average reflectivity curve. Note that the most dramatic improvement in the NI switching quality took place near the condition $\Delta_{sat}\approx\Delta$.

Figures 9A, 9B:
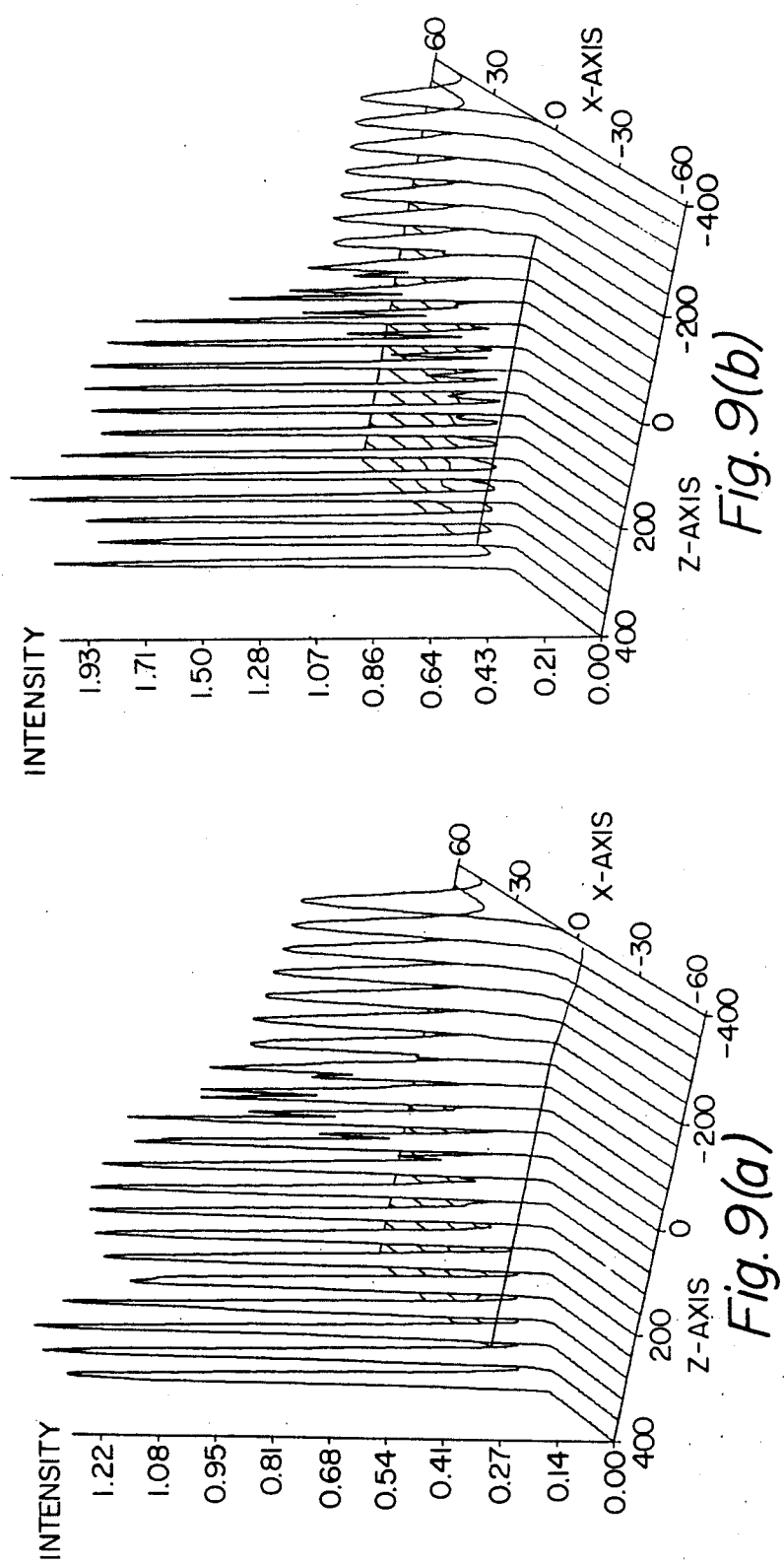
FIG. 9 is a graph illustrating the beam profile predicted for the hard limited SNI corresponding to FIG. 10(a): (a) $n_2I_{max}/\Delta=11.6$ and (b) $n_2I_{max}/\Delta=2.64$.

The saturation influences not only the reflected beam but also the transmitted one. Compare for example the clean, only slightly self focused (nearly Gaussian) transmitted beam profile in FIG. 9 with the 'messy' beam break up into multiple (13) self focused 'spikes' in FIG. 6. For intensity closer to the threshold as in FIG. 9(b) the self-focusing of the transmitted beam is more pronounced. Nevertheless the self focusing is still significantly reduced compared to the unsaturated case.

Based on a simple plane wave picture the effect off saturating the refractive index change should make itself notable only above the matching point of the two refractive indices comprising the NI. This point of total transmission ($\Delta n(I)=\Delta$) is at a higher intensity than the TIR threshold. One would therefore expect the threshold to be more or less saturation insensitive even in the Gaussian beam case, but as FIG. 7 and 8 show the SNI model predicts a more than doubling of the threshold intensity when $\Delta_{sat}$ approaches $\Delta$: the relative threshold intensity is 2.3/1.4/1.3/1 for $\Delta_{sat}=1/1.5/3/\infty \Delta$. At the first moment this behavior seems therefore counter intuitive. A more careful analysis of this predicted saturation effect shows that the explanation lays first in the nonplanar penetration of the evanescent wave in the second medium comprising the NI and second in the reduction of the gradient of the resulting local refractive index distribution through the saturation. In the condition of TIR the incident wave penetrates (exponentially damped) the second media, travels along the interface for a short distance and then curves back to the incident media. This longitudinal displacement is known as Goos Hänchen effect (see F. Goos and H. Hänchen, Ann. Physik 1(6), 333 (1947)). Tamir (see T. Tamir, JOSA A 3, 558, 1986) has shown that for cases where the amplitude or phase change of the reflectivity function varies most rapidly (for example near the critical angle) a Gaussian beam reflecting at a dielectric interface can exhibit lateral, focal, angular shifts and even a change in beam waist. Total internal reflection at a nonlinear interface can result also in a distortion of the reflected spatial beam profile (see A. E. Kaplan, Sov. Phys. JETP 45 896 (1977); D. R. Andersen, R. Cuykendall and J. Regan, Comp. Phys. Commun. 48, 255 (1988)). An investigation of the beam profiles when approaching the TIR threshold indicates that for hard limited Kerr-like nonlinearity the penetrated part of the incident beam can travel for a longer distance along the interface and still bend back to the linear medium (see FIG. 14) than in the unsaturated case. This causes the increase in the threshold intensity retarding the switching form TIR to partial transmission.

SNI dependence on the glancing angle $\Psi$

Figure 10:
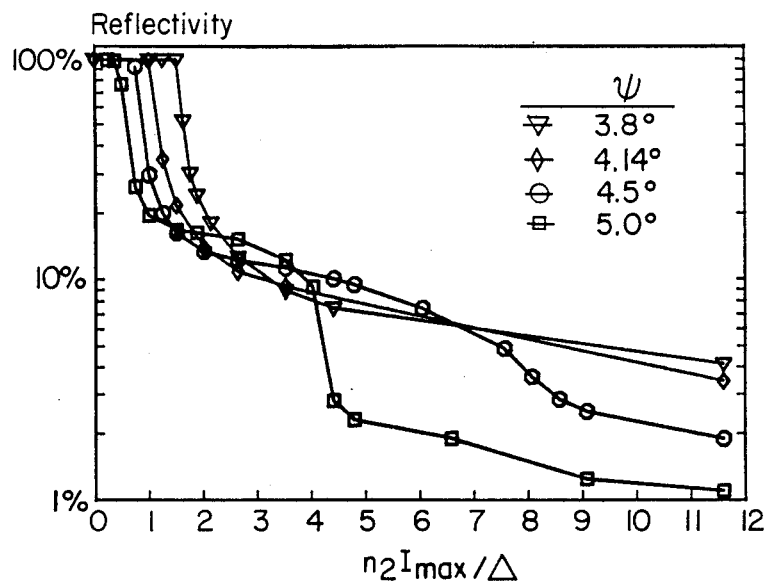
FIG. 10 is a graph showing the calculated NI reflectivity predicted by the hard limited SNI model for $\Delta sat = \Delta$ as a function of normalized intensity for various glancing angles: (a) $\Psi=3.80°$ (triangle); (b) $\Psi=4.14°$ (diamonds), (c) $\Psi=4.5°$ (spheres) and (d) $\Psi=5.0°$ (squares). Interface and beam parameters as in FIG. 5.

The variation of the saturated ($\Delta_{sat}=\Delta$) NI switching curve with the normalized glancing angle $\Psi/\Psi_{crit}$ is shown in FIG. 10 (a)-(d) for the cases $\Psi/\Psi_{crit}=0.55$, 0.60, 0.65 and 0.73. With increasing $\Psi/\Psi_{crit}$ a shoulder develops at the bottom of the knee causing a small rise in reflectivity for intensity values near the knee and a further reflectivity drop for intensities far from it. As for the standard model, the threshold intensity drops to lower values if $\Psi/\Psi_{crit}$ gets increased.

Figure 11:
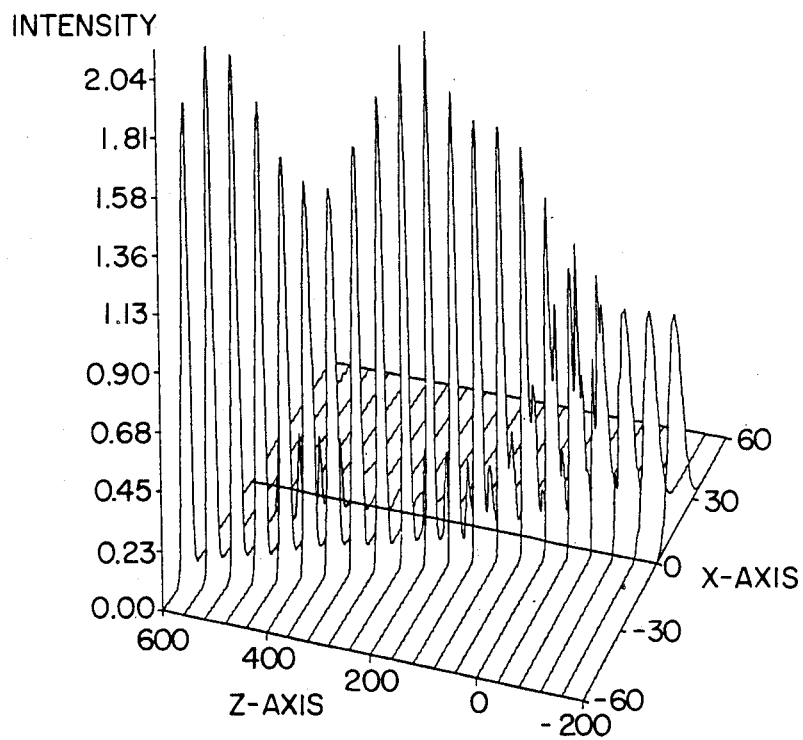
FIGS. 11(a)–11(b) are graphs showing the beam profile predicted for the hard limited SNI corresponding to FIG. 10(d): (a) $n_2I_{max}/\Delta=4.41$ and (b) $n_2I_{max}/\Delta=11.6$.
Figure 11B:
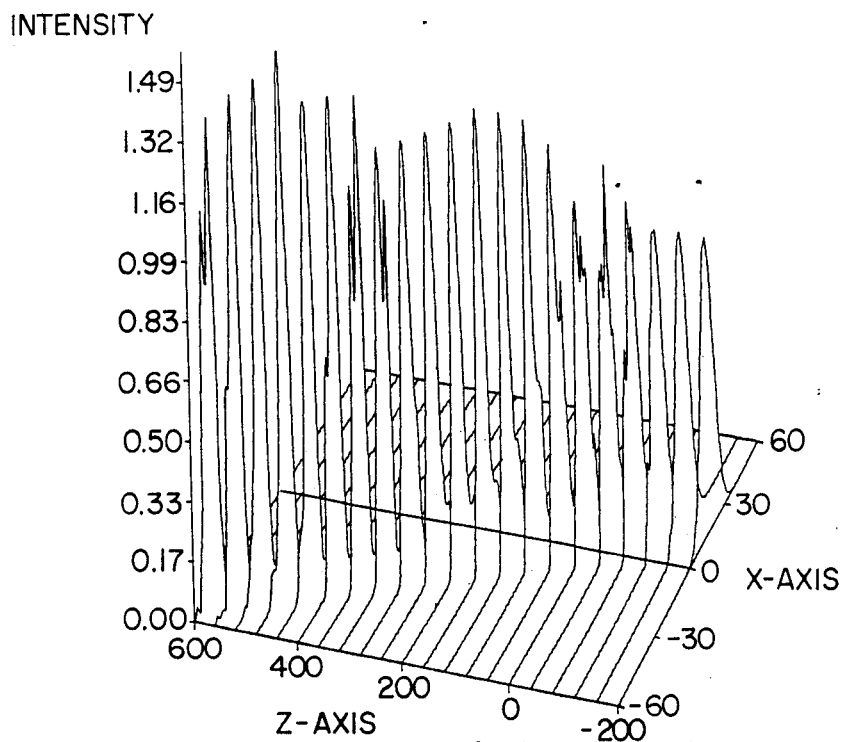

The development of a shoulder at higher glancing angle reassembles an additional, but much less pronounced intensity threshold. This second threshold produces quite different NI behavior than the equivalent one in the unsaturated case. It has a staircase-like form and typically a several times higher switching threshold. It also shows a quite different behavior for the transmitted channels (see FIG. 11). Right after the second threshold, instead of observing two highly self-focused channels of roughly similar highs a big, only slightly self-focused channel and a roughly ten times smaller one was found [FIG. 11(a)]. At even higher intensities [FIG. 11(b)], instead of resulting in two well separated self-focused channels, these two channels 'fuse' together to form again a more or less single channel with a little bit of structure on top of it. Even for this less advantageous reflectivity curve the switching behavior is definitively improved over the nonsaturated case. The development of the additional shoulder might put some limits on the usefulness of certain glancing angles $\Psi$ restricting its range for certain NI applications.

SNI dependence on the beam waist $w_o$

Figure 12:
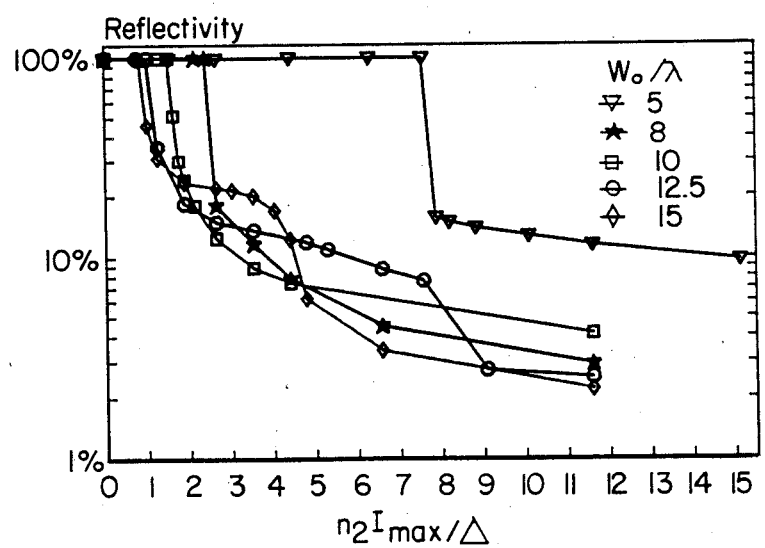
FIG. 12 shows the calculated NI reflectivity predicted by the hard limited SNI model for $\Delta_{sat}=\Delta$ as a function of normalized intensity at $\Psi=3.8$. The different symbols represent different beam waists $w_o$. Interface and beam parameters as in FIG. 5.

A dependence of the reflectivity curve on the beam waist $w_o$ is shown in FIG. 12. Increasing the beam waist from $5\lambda$ to $8\lambda$ raises the switching contrasts [at twice the threshold intensity] roughly 34%. An increase from $w_o=8\lambda$ to $w_o=10\lambda$ reduces the contrast to roughly its $w_o=5\lambda$ value. Further increase to $w_o=15\lambda$ causes a shoulder to appear resulting in an additional reduction of the contrast by a factor of two.

Figure 13:
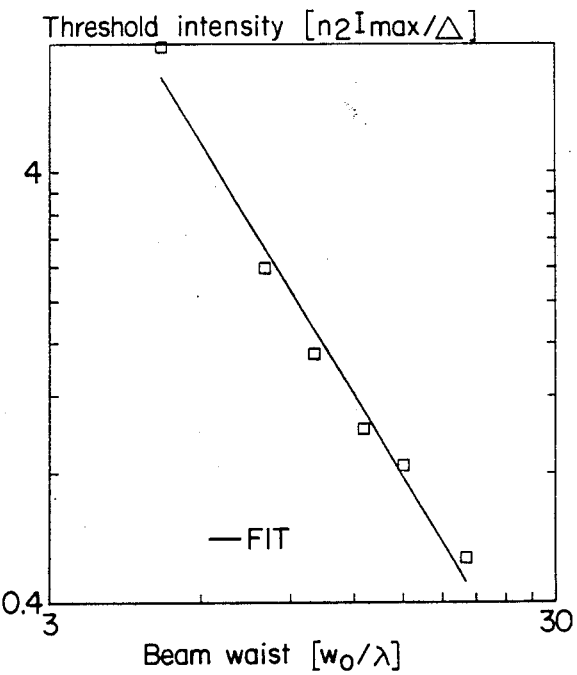
FIG. 13 is a graph showing the beam waist dependence off the SNI intensity threshold for the curves shown in FIG. 12. The solid line represent the best fit to a power dependence ($y=1.55\ x^{-1.95}$)
Figure 14A:
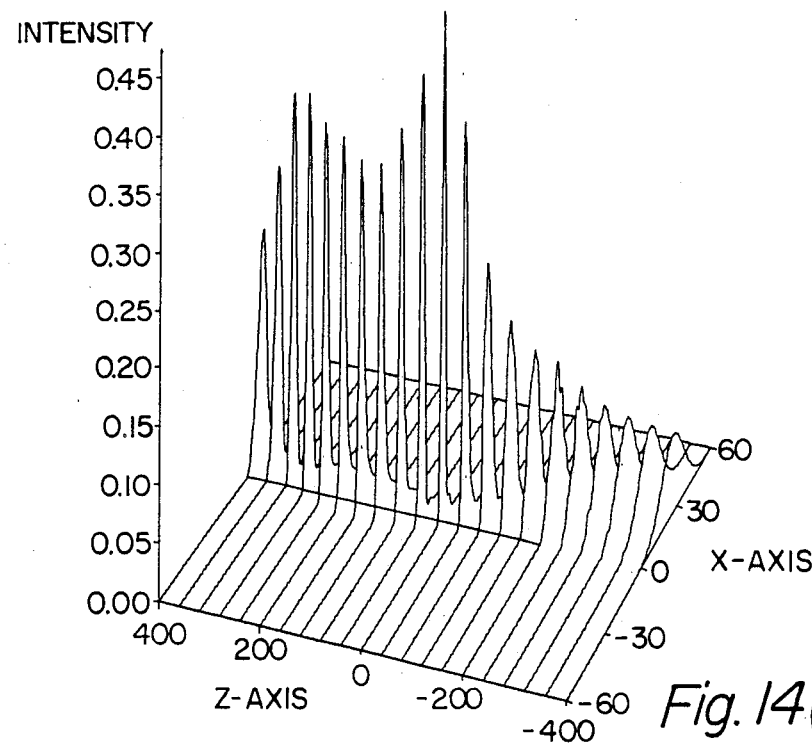
FIGS. 14(a)-14(b) are graphs depicting the SNI model beam profile corresponding to FIG. 12 with $w_o=5\lambda$: (a) $n_2 I_{max}/\Delta=6.3$ and (b) $n_2 I_{max}=7.9$. Note that the increase in lateral and angle shift and beam waist change for the reflected beam when going from case (a) to (b). The latter is right at the threshold to partially transmission.
Figure 14B:
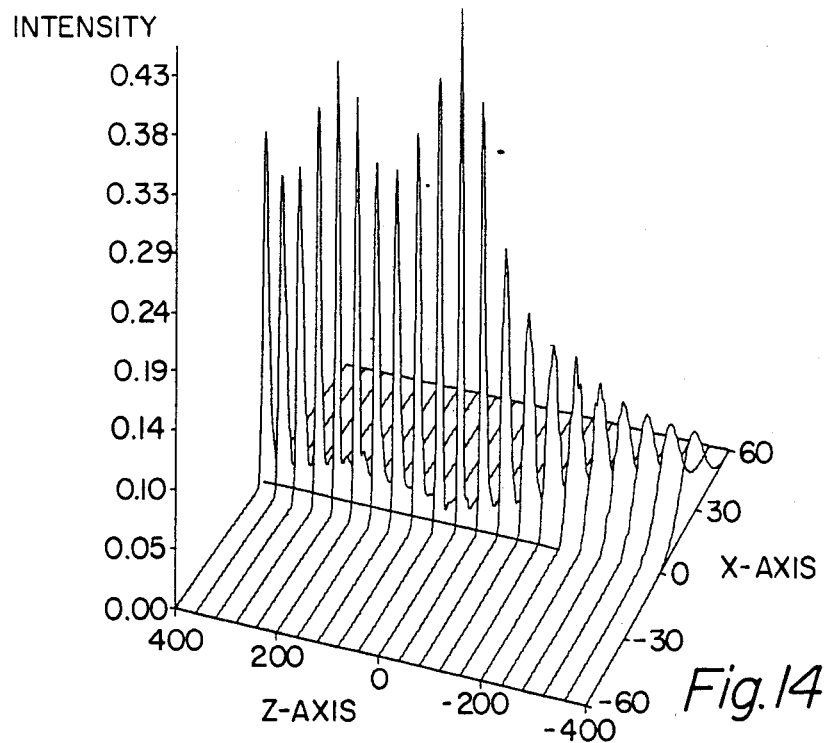

The variation of the threshold intensity with the beam waist $w_o$ is displayed in FIG. 13. The threshold varies for $w_o = 5/8/10/12.5/15\lambda$ approximately as $5.2/1.6/1/0.67/0.55\ n_2 I_{max}/\Delta$. A least square fit to these values shows that the threshold intensity scales ($5 \leq w_o \leq 20$) roughly like $w_o^{-2}$. Without saturation ($\Delta_{sat} = \infty$) the threshold intensity varies with the beam waist approximately as $w_o^{-0.26}$. This effect is again caused by the modified evanescent wave boundary condition. FIG. 14 shows the increase in lateral and angular shift for the reflected beam when approaching the threshold. A change in beam waist can also be observed. As tighter the focusing as more intensity is needed to overcome the total internal reflection. But since the threshold scales roughly as $w_o^{-2}$ for ideal saturation the amount of energy necessary to overcome the TIR is nearly beam waist independent.

SNI PREDICTION AND EXPERIMENT

Figure 15:
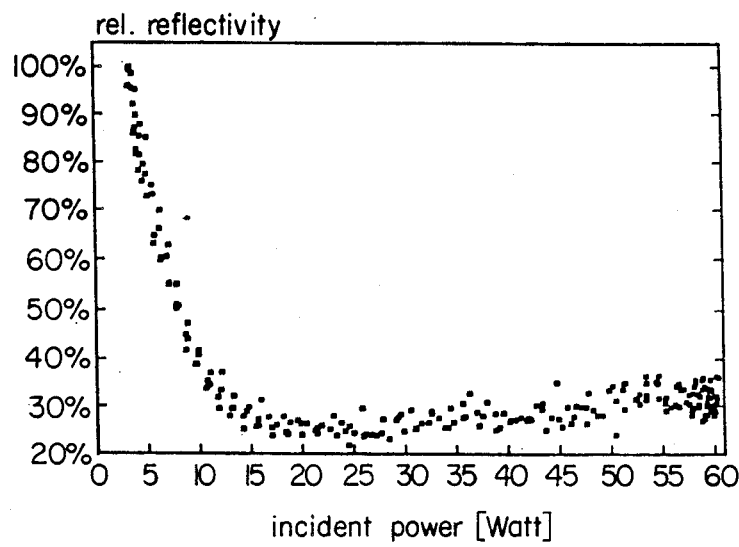
FIG. 15 is a graph showing the measured intensity dependence on NI reflectivity for $n_o=1.391$ and the calculated values $\Delta=0.031$, $n_2=0.56\ cm^2/MW$ and $w_o=4.4\ \mu m=8.6\lambda$.
Figure 16A:
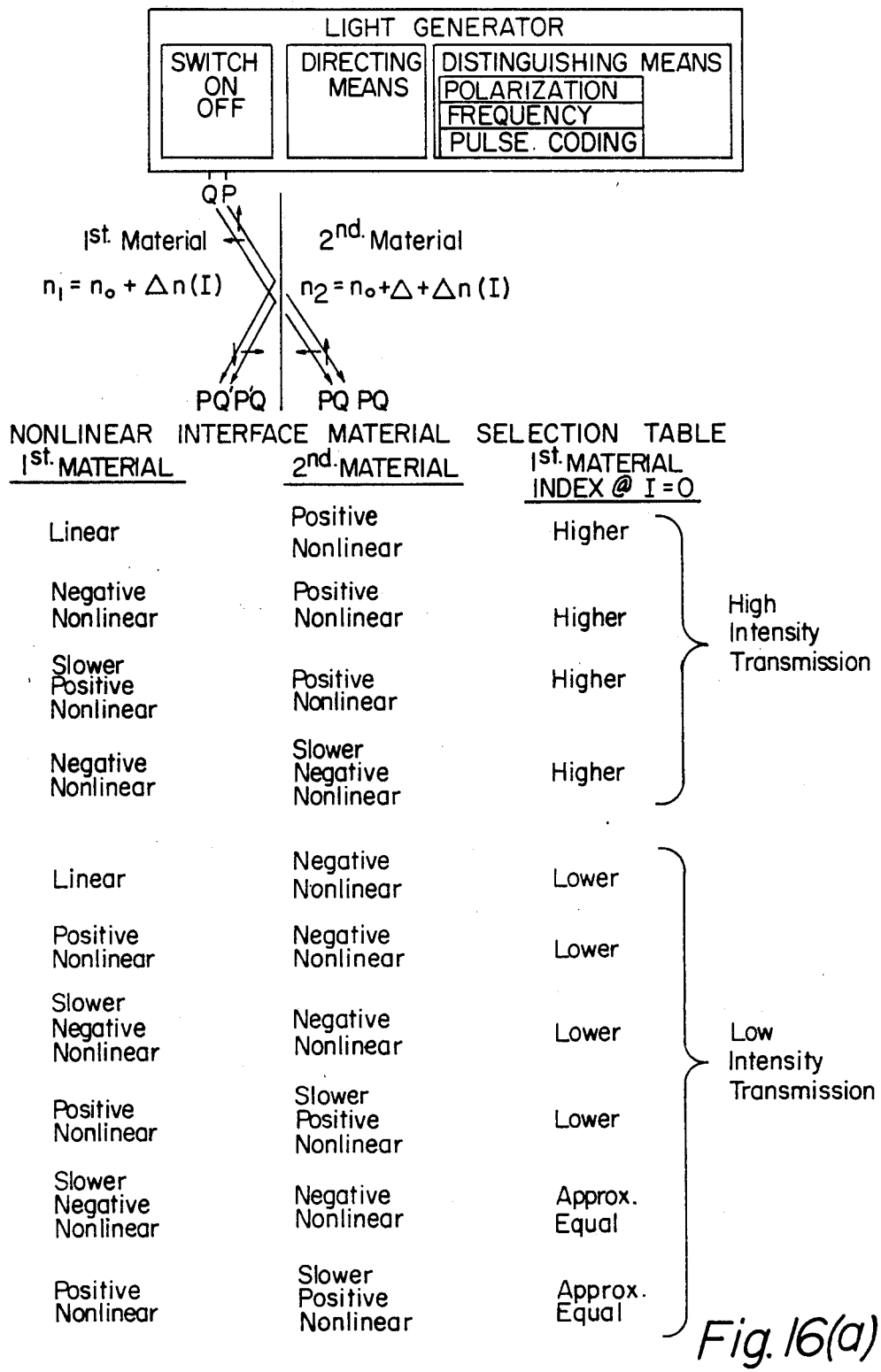
FIGS. 16(a)-16(b) are schematic diagrams showing (a) the nonlinear interface, the corresponding material selection table and (b) the Fabry-Perot embodiment with its material selection table.
Figure 16B:
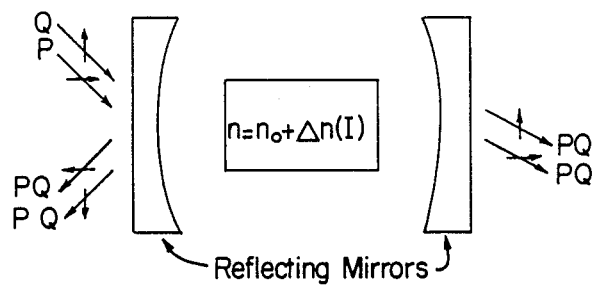

The results presented herein are consistent with the proposed explanation of the recent experiments suggesting that saturation enhanced the observed switching behavior. A comparison of FIG. 1 with the standard NI prediction [FIG. 5] and the hard limited SNI prediction [FIG. 11(b)] shows good agreement with the experimental data for the later model and very poor agreement with the former one. The quantitative disagreement between the experimental data and the SNI prediction can be explained by taking into account that (1) the hard limited saturation in equation (3) has in reality to be replaced with some kind of soft limited saturation, (2) that the experimental parameters $w_o$, $n_2$ and $\Delta$ where only known with limited accuracy and that (3) the experimentally saturation condition might still not have been totally optimized. Point (1) and (3) can easily account for the observed minimum reflectivity of 25% instead of 5% and (1) and (2) for the roughly two times higher intensity threshold. The reflectivity increase in FIG. 15 actually suggests that slight overshooting occurred in the experimental NI at very high intensity. A slight, quantitative disagreement is also to be expected from the truly two-dimensional nature of the SNI model and the not totally ideal and clean condition for the tree dimensional experiment.

CONCLUSION

It has been demonstrated that saturation of the refractive index response for the nonlinear medium comprising the NI can significantly enhance its switching quality and prevent the transmitted beam to breakup. This is a milestone for the development of NI application in optical signal processing and optical computing, etc. The SNI model predicts an increase of the threshold intensity when the limiting value $\Delta_{sat}$ approaches the zero intensity offset $\Delta$ and when the beam waist gets lowered. For a hard limited Kerr-like nonlinearity the 'ideal' saturation is $\Delta_{sat} = \Delta$. Small increase of this limit causes immediately the multiple thresholds, etc. to reappear and lower the switching contrast. The SNI model predicts a energy rather than intensity dependence for the switching threshold. It has found further that for certain glancing angles and beam waists, the reflectivity curve gets slightly distorted predicting limitations in the usefulness of certain parameter combinations. A more realistic model (3 dimensional with soft limited saturation and diffusion effect included) will differ quantitatively from this simplest SNI model prediction. The qualitative behavior, nevertheless, will be more or less as predicted.

The good qualitative agreement between SNI prediction and experiment leads to hope that actually even better NI switching quality may be obtained experimentally once the optimum saturation conditions are known and that knowledge can be implemented in the manufacturing of appropriate solid state materials.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

We claim:

1. An optical interaction gate comprising:
   a nonlinear interface including a first material having an index of refraction and a second material having a nonlinear index of refraction, said second material having an index of refraction equal to or greater than that of the first material for low intensities, and said first material and said second material being disposed in intimate contact with each other; and
   means for selectively generating and directing two distinguishable beams of approximately equal intensity upon said nonlinear interface such that when said beams have a first higher total intensity said beams reflect from said nonlinear interface and when said beams have a second lower total intensity said beams pass through said nonlinear interface.

2. The optical interaction gate of claim 1 wherein said beams are light beams distinguished by selectively and distinctly polarizing said light beams.

3. The optical interaction gate of claim 1 wherein said beams are light beams distinguished by selectively and distinctly modifying the frequency of said light beams.

4. The optical interaction gate of claim 1 wherein said beams are light beams distinguished by selectively and distinctly pulse coding each of said light beams.

5. The optical interaction gate of claim 1 wherein said beams are coaxial light beams.

6. The optical interaction gate of claim 1 wherein said first material is linear and said second material is negative nonlinear and has a higher index of refraction at zero intensity.

7. The optical interaction gate of claim 1 wherein said first material is positive nonlinear and said second material is negative nonlinear and has a higher index of refraction at zero intensity.

8. The optical interaction gate of claim 1 wherein said first material is slower negative nonlinear and said second material is negative nonlinear and has approximately the same or a higher index of refraction at zero intensity.

9. The optical interaction gate of claim 1 wherein said first material is positive nonlinear and said second material is slower positive nonlinear and has approximately the same or a higher index of refraction at zero intensity.

10. An optical interaction gate comprising:
    a nonlinear interface including a first material having an index of refraction and a second material having a nonlinear index of refraction, said first material and said second material being disposed in intimate contact with each other, wherein said first material is linear and said second material is positive nonlinear and has a lower index of refraction at zero intensity: and means for selectively generating and directing two distinguishable beams of approximately equal intensity upon said nonlinear interface such that when said beams have a first lower total intensity said beams reflect from said nonlinear interface and when said beams have a second higher total intensity said beams pass through said nonlinear interface.

11. An optical interaction gate comprising:

a nonlinear interface including a first material having an index of refraction and a second material having a nonlinear index of refraction, said first material and said second material being disposed in intimate contact with each other, wherein said first material is negative nonlinear and said second material is positive nonlinear and has a lower index of refraction at zero intensity; and means for selectively generating and directing two distinguishable beams of approximately equal intensity upon said nonlinear interface such that when said beams have a first lower total intensity said beams reflect from said nonlinear interface and when said beams have a second higher total intensity said beams pass through said nonlinear interface.

12. An optical interaction gate comprising:

a nonlinear interface including a first material having an index of refraction and a second material having a nonlinear index of refraction, said first material and said second material being disposed in intimate contact with each other, wherein said first material is slower positive nonlinear and said second material is positive nonlinear and has a lower index of refraction at zero intensity; and means for selectively generating and directing two distinguishable beams of approximately equal intensity upon said nonlinear interface such that when said beams have a first lower total intensity said beams reflect from said nonlinear interface and when said beams have a second higher total intensity said beams pass through said nonlinear interface.

13. An optical interaction gate comprising:

a nonlinear interface including a first material having an index of refraction and a second material having a nonlinear index of refraction, said first material and said second material being disposed in intimate contact with each other, wherein said first material is negative nonlinear and said second material is slower negative nonlinear and has a lower index of refraction at zero intensity; and means for selectively generating and directing two distinguishable beams of approximately equal intensity upon said nonlinear interface such that when said beams have a first lower total intensity said beams reflect from said nonlinear interface and when said beams have a second higher total intensity said beams pass through said nonlinear interface.

14. An optical interaction gate comprising:

a nonlinear interface including a first material having an index of refraction and a second material having a nonlinear index of refraction, said first material and said second material being disposed in intimate contact with each other, wherein said first material and said second material are chosen with $\Delta n(I) = -\Delta_{SAT} \times f(I)$, wherein $\Delta n(I)$ is the intensity (I) dependent nonlinear refractive index response function, $\Delta_{SAT}$ is a limiting value, and $f(I)$ is a characteristic normalized function with $|f(I)| \leq 1$ and $f(o) = 0$, allowing reflection at a first total intensity and transmission at a second total intensity; and means for selectively generating and directing two distinguishable beams of approximately equal intensity upon said nonlinear interface such that when said beams have a first total intensity said beams reflect from said nonlinear interface and when said beams have a second total intensity said beams pass through said nonlinear interface.

15. The optical interaction gate of claim 14 wherein reflection at a first total intensity and transmission at a second total intensity are optimized.

16. The optical interaction gate of claim 14 wherein said second total intensity is higher than said first total intensity.

17. The optical interaction gate of claim 16 wherein said first material is linear and said second material is positive nonlinear and has a lower index of refraction at zero intensity.

18. The optical interaction gate of claim 16 wherein said first material is negative nonlinear and said second material is positive nonlinear and has a lower index of refraction at zero intensity.

19. The optical interaction gate of claim 16 wherein said first material is negative nonlinear and said second material is slower negative nonlinear and has a lower index of refraction and zero intensity.

20. The optical interaction gate of claim 16 wherein said first material is slower positive nonlinear and said second material is positive nonlinear and has a lower index of refraction at zero intensity.

21. The optical interaction gate of claim 14 wherein said second total intensity is lower than said first total intensity.

22. The optical interaction gate of claim 21 wherein said first material is linear and said second material is negative nonlinear and has a higher index of refraction at zero intensity.

23. The optical interaction gate of claim 21 wherein said first material is positive nonlinear and said second material is negative nonlinear and has a higher index of refraction and zero intensity.

24. The optical interaction gate of claim 21 wherein said first material is slower negative nonlinear and said second material is negative nonlinear and has approximately the same or a higher index of refraction at zero intensity.

25. The optical interaction gate of claim 21 wherein said first material is positive nonlinear and said second material is slower positive nonlinear and has approximately the same or a higher index of refraction at zero intensity.

26. The optical interaction gate of claim 14 wherein $\Delta n(I)$ is hard limited.

27. The optical interaction gate of claim 14 wherein $|f(I)| = \tanh[n_{NL}*I/|\Delta|]$ with $|\Delta|$ being the absolute value of the refractive index difference between said first and said second materials at zero intensity and $n_{NL}$ being an appropriate constant.

28. The optical interaction gate of claim 14 wherein $$f(I) = \frac{n_{NL} \cdot I}{|\Delta| + |n_{NL} \cdot I|}.$$

with $|\Delta|$ being the absolute value of the refractive index difference between said first and said second materials at zero intensity and $n_{NL}$ being an appropriate constant.

29. The optical interaction gate of claim 14 with hard limited saturation wherein $$f(I)_1 = \begin{cases} F(I) \text{ if } F(I) \leq 1 \\ \text{ if } F(I) > 1 \end{cases}$$

and where F(I) is a monotone continuous function with $F(0)=0$ and $F(\infty)>1=)>1$.

30. An optical interaction gate, comprising:
   a nonlinear Fabry-Perot etalon comprised of a material with a nonlinear index of refraction sandwiched between two reflective surfaces, said etalon exhibiting high transmission at low intensities; and
   means for selectively generating and directing two distinguishable beams of approximately equal intensity upon said etalon such that when said beams have a first higher total intensity said beams reflect from said etalon and when said beams have a second lower total intensity said beams pass through said etalon.

31. The optical interaction gate of claim 30 wherein said beams are light beams distinguished by selectively and distinctly polarizing each of said light beams.

32. The optical interaction gate of claim 30 wherein said beams are light beams distinguished by selectively and distinctly modifying the frequency of each of said light beams.

33. The optical interaction gate of claim 30 wherein said beams are light beams distinguished by selectively and distinctly pulse coding each of said light beams.

34. The optical interaction gate of claim 32 wherein said beams are coaxial light beams.

35. The optical interaction gate of claim 30 wherein said material is positive nonlinear.

36. The optical interaction gate of claim 30 wherein said material is negative nonlinear.

37. An optical interaction gate comprising:
   a nonlinear Fabry-Perot etalon comprised of a material with a nonlinear index of refraction sandwiched between two reflective surfaces, wherein said material is positive nonlinear; and
   means for selectively generating and directing two distinguishable beams of approximately equal intensity upon said etalon such that when said beams have a first lower total intensity said beams reflect from said etalon and when said beams have a second higher total intensity said beams pass through said etalon.

38. An optical interaction gate comprising:
   a nonlinear Fabry-Perot etalon comprised of a material with a nonlinear index of refraction sandwiched between two reflective surfaces, wherein said material is negative nonlinear; and
   means for selectively generating and directing two distinguishable beams of approximately equal intensity upon said etalon such that when said beams have a first lower total intensity said beams reflect from said etalon and when said beams have a second higher total intensity said beams pass through said etalon.

* * * * *